(12) United States Patent
Varnum et al.

(10) Patent No.: US 8,990,548 B2
(45) Date of Patent: Mar. 24, 2015

(54) APPARATUSES FOR CONFIGURING PROGRAMMABLE LOGIC DEVICES FROM BIOS PROM

(75) Inventors: Robert M. Varnum, Beaverton, OR (US); Aslam H. Haswarey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 13/084,322

(22) Filed: Apr. 11, 2011

(65) Prior Publication Data

US 2012/0260078 A1    Oct. 11, 2012

(51) Int. Cl.
G06F 15/177    (2006.01)
G06F 9/00    (2006.01)
G06F 15/78    (2006.01)

(52) U.S. Cl.
CPC ................ *G06F 15/7871* (2013.01)
USPC .................................. 713/2; 713/1

(58) Field of Classification Search
USPC ........................................ 713/1, 2
See application file for complete search history.

(56) References Cited

U.S. PATENT DOCUMENTS

| | | | |
|---|---|---|---|
| 6,351,809 B1 * | 2/2002 | St. Pierre et al. | 713/1 |
| 7,281,082 B1 * | 10/2007 | Knapp | 711/103 |
| 7,613,931 B2 * | 11/2009 | Tonami et al. | 713/189 |
| 7,620,795 B1 * | 11/2009 | Ryser | 712/9 |
| 7,822,958 B1 * | 10/2010 | Allen et al. | 713/1 |
| 8,386,759 B1 * | 2/2013 | Duwel | 713/2 |
| 2003/0023771 A1 | 1/2003 | Erickson et al. | |
| 2003/0028826 A1 | 2/2003 | Balluff | |
| 2003/0128050 A1 * | 7/2003 | Schultz | 326/41 |
| 2003/0182545 A1 * | 9/2003 | Chalmers et al. | 713/1 |
| 2003/0229770 A1 * | 12/2003 | Jeddeloh | 711/213 |
| 2004/0093488 A1 * | 5/2004 | Horanzy | 713/1 |

(Continued)

FOREIGN PATENT DOCUMENTS

| | | |
|---|---|---|
| TW | 382132 B | 2/2000 |
| WO | 2012/141743 A1 | 10/2012 |

OTHER PUBLICATIONS

International Search Report and Written Opinion received for PCT application No. PCT/US2011/061861, mailed on Jun. 27, 2012, 9 Pages.

(Continued)

*Primary Examiner* — Zahid Choudhury
(74) *Attorney, Agent, or Firm* — Jordan IP Law, LLC

(57) ABSTRACT

An apparatus comprising programmable logic devices including a field programmable gate array (FPGA) is presented. In one embodiment, the apparatus also comprises a programmable read only memory (PROM) to store a firmware which includes at least a system boot code and a configuration code. The apparatus further includes a configuration agent to configure the FPGA by using the configuration code and to release the reset to the CPU after the FPGA is configured. In one embodiment, the configuration agent comprises a SPI-FPGA bridge (serial peripheral interface to FPGA configuration interface). In one embodiment, the configuration agent is operable to determine whether the FPGA is ready for configuration based at least on a status from the FPGA.

10 Claims, 4 Drawing Sheets

(56) References Cited

U.S. PATENT DOCUMENTS

| | | |
|---|---|---|
| 2005/0283601 A1 | 12/2005 | Tahan |
| 2006/0149954 A1 | 7/2006 | Hageman et al. |
| 2006/0200658 A1* | 9/2006 | Penkethman ............. 713/2 |
| 2007/0250696 A1* | 10/2007 | Ryser ....................... 713/1 |
| 2007/0260869 A1* | 11/2007 | Dade et al. ............... 713/2 |
| 2008/0005549 A1* | 1/2008 | Ke ............................ 713/1 |
| 2009/0063834 A1* | 3/2009 | Huang et al. ............. 713/2 |
| 2009/0228884 A1* | 9/2009 | Chong et al. ............. 718/1 |
| 2010/0299510 A1* | 11/2010 | Ueltschey et al. ........ 713/2 |

OTHER PUBLICATIONS

International Preliminary Report on Patentability Received for Patent Application No. PCT/US2011/061861, mailed on Oct. 24, 2013, 6 Pages.

Notice of Allowance received for Taiwan Patent Application No. 100143955, mailed on Dec. 31, 2014, 3 pages of Notice of Allowance including 1 page of English translation.

* cited by examiner

APPARATUSES FOR CONFIGURING PROGRAMMABLE LOGIC DEVICES FROM BIOS PROM

FIELD OF THE INVENTION

Embodiments of the invention relate to configuring programmable logic devices in a computing system.

BACKGROUND OF THE INVENTION

Modern computer-based multimedia applications, such as video, graphics and audio processing, may include computationally intensive data processing. The processing burden may be distributed among other devices, such as, programmable logic devices coupled to a computing system.

Typically, after a system reset, programmable logic devices have to be configured before they can be utilized in the system. Vendor-specific configuration read-only memory (PROMs) may be required to configure/program the programmable logic devices, for example, field programmable gate arrays (FPGAs). For example, manufacturers of FPGAs produce and sell configuration PROMs which are designed specifically for programming the FPGAs. The cost of these PROMs has become another burden to many computer system manufacturers who use FPGAs in their products.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
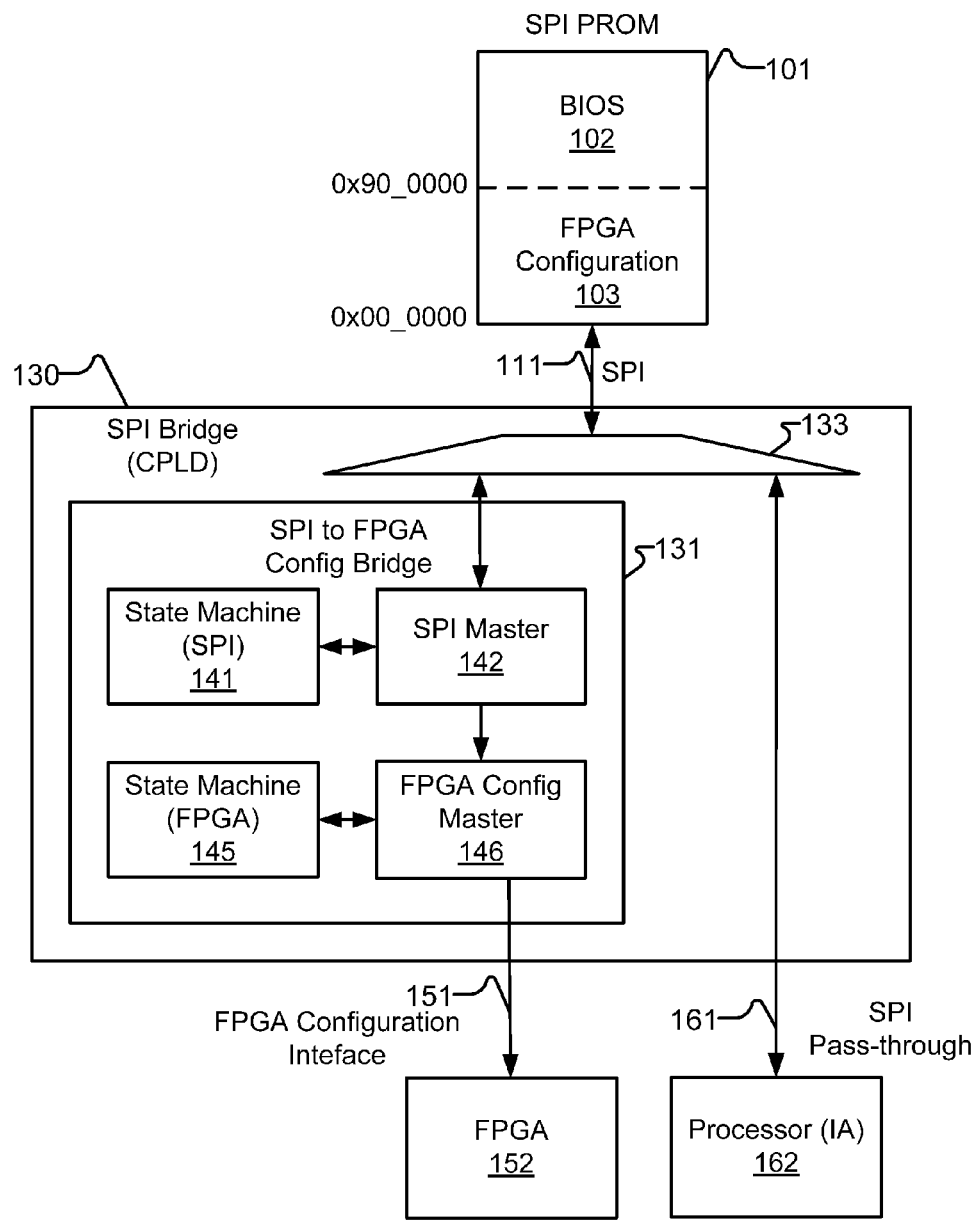
FIG. 1 is a block diagram of a system to configure programmable logic devices in accordance with one embodiment of the invention.

An apparatus comprising programmable logic devices including a field programmable gate array (FPGA) is presented. In one embodiment, the apparatus also comprises a programmable read only memory (PROM) to store a firmware which includes at least a system boot code and a configuration code. The apparatus further includes a configuration agent to configure the FPGA by using the configuration code and to release the reset to the CPU after the FPGA is configured. In one embodiment, the configuration agent comprises a SPI-FPGA bridge (serial peripheral interface to FPGA configuration interface). In one embodiment, the configuration agent is operable to determine whether the FPGA is ready for configuration based at least on a status from the FPGA. In one embodiment, the configuration agent is operable to release the reset to the CPU after one or more FPGAs are configured.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for configuring programmable logic devices. Specifically, the method and apparatus for configuring programmable logic devices are primarily discussed in reference to multi-core processor computer systems. However, the method and the apparatus for configuring programmable logic devices are not so limited, as they may be implemented on or in association with any integrated circuit device or system, such as cell phones, personal digital assistants, embedded controllers, mobile platforms, desktop platforms, and server platforms, as well as in conjunction with other resources.

Overview

An apparatus comprising programmable logic devices including a field programmable gate array (FPGA) is presented. In one embodiment, the apparatus also comprises a programmable read only memory (PROM) to store a firmware which includes at least a system boot code and a configuration code. The apparatus further includes a configuration agent to configure the FPGA by using the configuration code and to release the reset to the CPU after the FPGA is configured. In one embodiment, the configuration agent comprises a SPI-FPGA bridge (serial peripheral interface to FPGA configuration interface). In one embodiment, the configuration agent is operable to determine whether the FPGA is ready for configuration based at least on a status from the FPGA. In one embodiment, the configuration agent is operable to release the reset to the CPU after one or more FPGAs are configured.

FIG. 1 is a block diagram of a system to configure programmable logic devices in accordance with one embodiment of the invention. Many related components such as buses and peripherals have not been shown to avoid obscuring the invention. Referring to FIG. 1, in one embodiment, the system includes programmable read only memory 101 (PROM 101), serial peripheral interface bridge 130 (SPI bridge 130), field programmable gate array 152, and processor 162.

In one embodiment, the aforementioned units are shown as discrete components. Other embodiments are possible where some or all of units are integrated within a device or within other components. In other embodiments, the aforementioned units are distributed throughout a system in hardware, software, or some combination thereof.

In one embodiment, PROM 101 stores a firmware thereon which includes at least BIOS 102 (basic input/output system) and FPGA configuration code 103. In one embodiment, BIOS 102 is a system boot code which is used by the system to prepare the pre-boot environment so that an operating system can take over the system boot. In one embodiment, BIOS 102 and FPGA configuration 103 are accessible at different addresses (e.g., 0x00_000, 0x90_0000).

In one embodiment, the system boot code comprises basic input/output system (BIOS) modules or unified extensible firmware interface (UEFI) modules to prepare a pre-boot environment for an operating system.

In one embodiment, PROM 101 is also referred to as a SPI PROM as PROM 101 is operable to communicate with SPI bridge 130 via an SPI interface (i.e., SPI 111).

In one embodiment, SPI bridge 130 is implemented by using a CPLD (complex programmable logic device). In other embodiments SPI bridge 130 is implemented using programmable logic devices (FPGA, CPLD, etc.), application specific integrated circuits, custom logic circuits, or any combinations thereof. In one embodiment, SPI bridge 130 includes multiplexer 133 (switch) and SPI-FPGA bridge 131. SPI-FPGA bridge 131 is a bridge of a serial peripheral interface to a FPGA configuration interface. In one embodiment, SPI bridge 130 is coupled to processor 162 via SPI pass-through 161.

In one embodiment, SPI-FPGA bridge 131 includes state machine (SPI) 141, SPI master 142, state machine (FPGA) 145, and FPGA configuration master 146. In one embodiment, SPI-FPGA bridge 131 is coupled to FPGA 152 via FPGA configuration interface 151.

In one embodiment, when a system powers-up (or after a system reset), SPI bridge 130 determines the status of FPGA 152, for example by detecting whether a status pin of FPGA 152 is asserted or otherwise. For example, in one embodiment, a status pin of FPGA 152 is asserted if FPGA 152 is prepared/ready for the configuration process.

In one embodiment, SPI bridge 130 reads configuration data (e.g., FPGA configuration code 103) from PROM 101 and configures FPGA 152 using the FPGA configuration code 103.

In one embodiment, PROM 101 is coupled to SPI bridge 130 (e.g., implemented using a small CPLD). In one embodiment, SPI bridge 130 is set in between processor 162 and PROM 101 such that PROM 101 is not directly coupled to processor 162.

In one embodiment, FPGA 152 or any FPGAs to be configured is coupled to SPI bridge 130, particularly SPI-FPGA bridge 131.

In one embodiment, SPI bridge 130 holds the processor at reset while SPI bridge 130 reads FPGA configuration file 103 from PROM 101. In one embodiment, SPI bridge 130 configures FPGA 152 in the system in conjunction with SPI-FPGA bridge 131.

In one embodiment, state machine (SPI) 141 and SPI master 142 manage SPI operations and communications. In one embodiment, SPI Master 142 is able to communicate with FPGA configuration master 146. In one embodiment, SPI master 142 sends/propagates data (e.g., FPGA configuration code 103) to FPGA configuration master 146 for the purpose of configuring FPGA 152. In one embodiment, FPGA configuration master 146 manages the process to configure FPGA 152 (and other programmable logic devices) in conjunction with state machine (FPGA) 145.

In one embodiment, SPI bridge 130 halts the reset to processor 162 while configuring FPGA 152. In one embodiment, after all FPGAs are configured, SPI bridge 130 releases the reset to processor 162. SPI bridge 130 also provides a pass-through path for processor 162 to access PROM 101 after the configurations of FPGAs are complete. For example, SPI bridge 130 switches a multiplexer (i.e., multiplexer 133) to create a pass-through path for processor 162 to access the system boot code after the reset has been released.

In one embodiment, processor 162 reads BIOS 102 stored in PROM 101 to configure input/output devices of a system and to prepare a pre-boot environment for an operating system.

In one embodiment, the cost of storing FPGA configuration code 103 on PROM 101 is lower than storing the code on a vendor specific configuration PROM. In one embodiment, a system allows co-location of the FPGA code and the BIOS code in a same non-volatile memory device. In one embodiment, a system uses the BIOS update utility to update the FPGA code, the BIOS image, or both concurrently.

In one embodiment, a BIOS code and a FPGA code are combined into a firmware (a firmware image) as a single integrated software release. In one embodiment, SPI bridge 130 enables updating a FPGA code without requiring a special JTAG cable from a FPGA vendor. As such, a JTAG interface specific to the FPGA vendor is also not required. In one embodiment, an FPGA image may be updated even if a user does not have direct access to the hardware. A user is able to update the FPGA image by using the approach in BIOS update utilities.

In one embodiment, FPGA 152 is a programmable logic device. In one embodiment, one or more programmable logic devices are found in a system. The programmable logic devices may include one or more field programmable gate arrays (FPGAs), one or more complex programmable logic devices (CPLDs), or any combinations thereof. In one embodiment, FPGA 152 includes proprietary embedded FPGA cores.

In one embodiment, processor 162 is a central processing unit. In one embodiment, processor 162 includes an input/output controller hub, for example, a platform controller hub (PCH), which supports a number of high speed peripheral devices of various I/O protocols and standards. In one embodiment, the PCH is operable to support serial peripheral interfaces. Processor 162 retrieves data from SPI bridge 130 via the PCH.

In order to provide Original Equipment Manufacturers (OEMs) the flexibility, a platform controller hub may include given host controller(s) to support peripheral device(s) in conjunction with the respective protocol(s). In one embodiment, the PCH also supports various I/O devices including devices operating in conjunction with PCIe (Peripheral Component Interconnect Express), SATA (Serial Advanced Technology Attachment) device, and USB (Universal Serial Bus). In one embodiment, a converged I/O replaces multiple connector types found on computers (e.g., a universal serial bus (USB) interface, an IEEE 1394 interface, Ethernet, eSATA, VGA, DVI, DisplayPort, and HDMI) with a single connector type.

Figure 2:
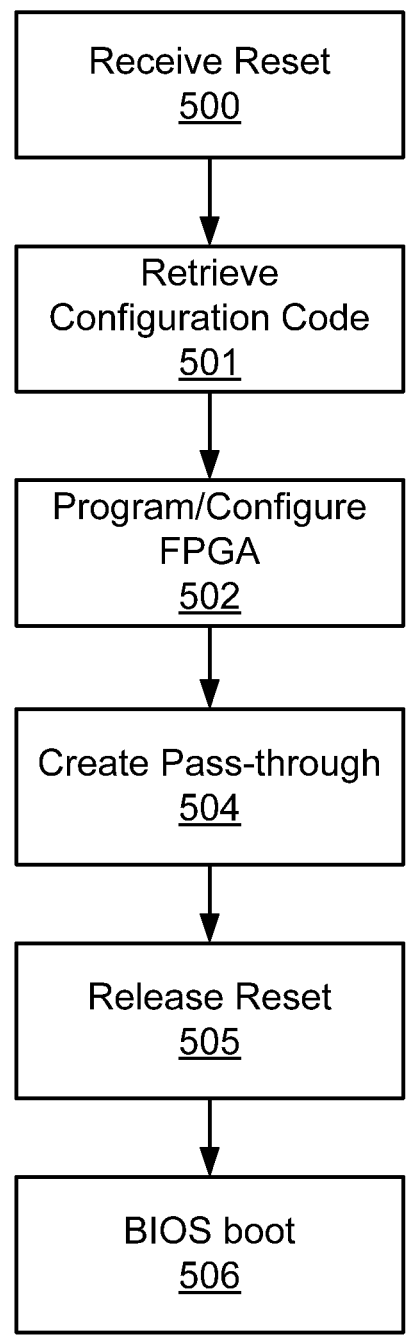
FIG. 2 is a flow diagram of one embodiment of a process to configure programmable logic devices.

FIG. 2 is a flow diagram of one embodiment of a process to configure programmable logic devices. The process is performed by processing logic that may comprise hardware (circuitry, dedicated logic, etc.), software (such as one that is run on a general purpose computer system or a dedicated machine), or a combination of both. In one embodiment, the process is performed in conjunction with an apparatus (e.g., SPI bridge 130 with respect to FIG. 1). In one embodiment, the process is performed by a computer system with respect to FIG. 3.

Referring to FIG. 2, in one embodiment, processing logic begin by receiving a system event (process block 500), for example, a system reset event, a reboot event, or a system boot event to reboot a computing system.

In one embodiment, processing logic holds the system reset (to a CPU) temporarily so that processing logic is able to configure one or more FPGAs. For example, processing logic holds the CPU at reset temporarily so that all FPGAs are configured before the reset is released to the CPU.

In one embodiment, processing logic determines whether the one or more FPGAs are ready for configuration by detecting status pins of the FPGAs. In one embodiment, processing logic retrieves a configuration code associated with an FPGA (process block 501). The configuration code is stored on a programmable read only memory (PROM) which contains a firmware including the configuration code and a system boot code.

In one embodiment, processing logic configures the FPGA using the configuration code (process block 502). It will be appreciated by those skilled in the art that the configuration of one or more FPGAs may be performed concurrently or serially using a same configuration code or different configuration codes based on the system design.

In one embodiment, processing logic enables a pass-through interface between the PROM and the CPU, such that the CPU is able to access a system boot code (process block 504). For example, processing logic switches a multiplexer to create a pass-through path for the CPU to access the system boot code after the reset has been released.

In one embodiment, processing logic releases the system reset to the CPU to prepare a pre-boot environment for an operating system (process block 505). In one embodiment, processing logic continues with a regular system boot sequence in accordance with the BIOS (process block 506).

Figure 3:
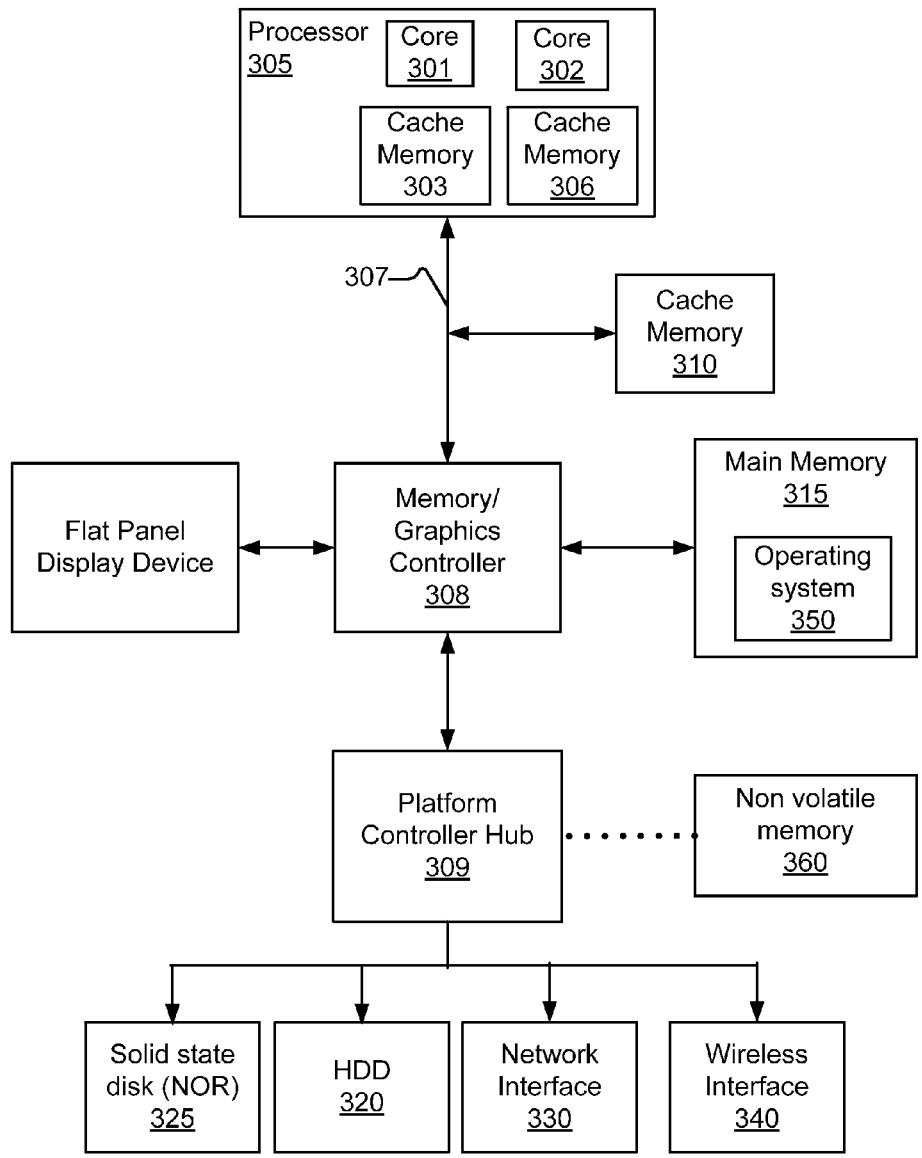
FIG. 3 illustrates a computer system for use with one embodiment of the present invention.

FIG. 3 is a block diagram illustrating a computer system in accordance with one embodiment of the present invention. In one embodiment, the computer system includes processor 305, memory/graphics controller 308, platform controller hub 309, main memory 315, and non-volatile memory 360. In one embodiment, processor 305 accesses data from level 1 (L1) cache memory 306, level 2 (L2) cache memory 310, and main memory 315. In one embodiment, processor 305 is coupled to memory/graphics controller 308. Memory/graphics controller 308 is coupled to platform controller hub 309, which in turn, coupled to solid state disk 325, hard disk drive 320, network interface 330, and wireless interface 340. In one embodiment, main memory 315 loads operating system 350.

In one embodiment, processor 305 comprises core 301, core 302, cache memory 303, and cache memory 306. In one embodiment, cache memory 303 is a private cache of core 301, whereas cache memory 306 is a private cache of core 302.

In one embodiment, main memory 315 may be implemented in various memory sources, such as dynamic random-access memory (DRAM), hard disk drive (HDD) 320, solid state disk 325 based on NVRAM technology, or a memory source located remotely from a computer system via network interface 330 or via wireless interface 340 containing various storage devices and technologies. The cache memory may be located either within the processor or in close proximity to the processor, such as on the processor's local bus 307.

In one embodiment, non-volatile memory 360 is a system read only memory (ROM) or a non-volatile memory device. In one embodiment, non-volatile memory 360 is not directly coupled to platform controller hub 309. In one embodiment, a configuration agent is operable to configure one or more programmable logic devices of the system (not shown) using codes stored in non-volatile memory 360.

In one embodiment, platform controller hub 309 includes one or more I/O host controllers that control one or more I/O interconnects (not shown). In one embodiment, platform controller hub 309 is coupled to processor 305 with a single link (i.e., interconnect or bus). In one embodiment, this coupling may be accomplished over a series of links. In one embodiment, processor 305 is coupled over a first link (e.g., local bus 307) to memory/graphics controller 308 (where the memory complex interfaces with a memory subsystem), and memory/graphics controller 308 is coupled to platform controller hub 309 over a second link. In one embodiment, I/O interconnects are a combination of point-to-point interconnects and buses.

In many embodiments, at least one processor 305 is present. In one embodiment, multiple processor cores are present in the system (cores 301-302). In one embodiment, multiple processors, each with single or multi-cores are present in the system (not shown). In embodiments where there are multiple cores and/or multiple processors in the system, a single master core is designated to perform boot and other such system handling processes in the system.

In one embodiment, processor 305, cache memory 306, memory/graphics controller 308, and platform controller hub 309 are in a same package. In one embodiment, processor 305, cache memory 306, memory/graphics controller 308, and platform controller hub 309 are on a same substrate. In one embodiment, processor 305, cache memory 306, memory/graphics controller 308, and platform controller hub 309 are on a same substrate or in a same package.

Other embodiments of the invention, however, may exist in other circuits, logic units, or devices in conjunction with the system of FIG. 3. Furthermore, other embodiments of the invention may be distributed throughout several circuits, logic units, or devices illustrated in FIG. 3.

Figure 4:
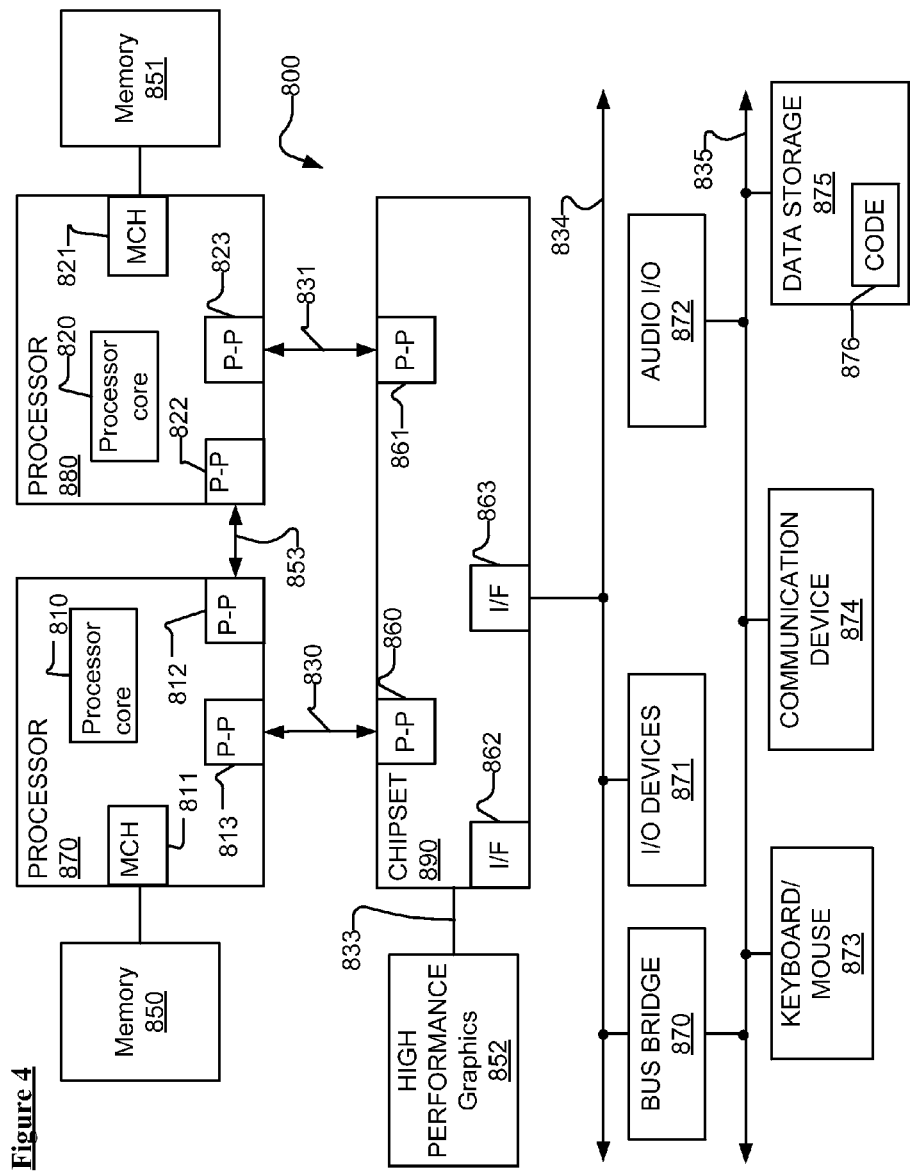
FIG. 4 illustrates a point-to-point computer system for use with one embodiment of the invention.

FIG. 4 illustrates a point-to-point computer system for use with one embodiment of the invention.

FIG. 4, for example, illustrates a computer system that is arranged in a point-to-point (PtP) configuration. In particular, FIG. 4 shows a system where processors, memory, and input/output devices are interconnected by a number of point-to-point interfaces.

The system of FIG. 4 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 4.

Other embodiments of the invention, however, may exist in other circuits, logic units, or devices within the system of FIG. 4. Furthermore, in other embodiments of the invention may be distributed throughout several circuits, logic units, or devices illustrated in FIG. 4.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An apparatus comprising:
one or more programmable logic devices including a first field programmable gate array (FPGA);
a programmable read only memory (PROM) to store a firmware including at least a system boot code and a first configuration code, wherein the PROM is indirectly coupled to the first FPGA, and wherein the system boot code comprises basic input/output system (BIOS) modules or unified extensible firmware interface (UEFI) modules to prepare a pre-boot environment for an operating system; and
a configuration agent, coupled to the first FPGA and a central processing unit (CPU), to configure the first FPGA by using the first configuration code and to release a reset to the CPU after the first FPGA is configured, wherein during a system boot sequence, the configuration agent is operable to hold the CPU at reset temporarily so that the first FPGA is configured before the reset is released to the CPU.

2. The apparatus of claim 1, wherein the configuration agent comprises a SPI-FPGA bridge (serial peripheral interface to FPGA configuration interface), wherein the configuration agent is coupled to the first FPGA via the FPGA configuration interface.

3. The apparatus of claim 1, wherein the PROM is not directly coupled to the CPU, wherein the configuration agent is operable to switch a connection to create a pass-through path for the CPU to access the system boot code after the reset has been released.

4. The apparatus of claim 1, wherein the first configuration code is retrieved prior to accessing the system boot code, wherein the configuration agent is operable to determine whether the first FPGA is ready for configuration based at least on a status from the first FPGA.

5. The apparatus of claim 1, wherein the CPU comprises a platform controller hub to support data retrieval from the PROM via a serial peripheral interface pass-through supported by the configuration agent.

6. The apparatus of claim 1, wherein both the system boot code and the first configuration code are updated in a single update operation.

7. The apparatus of claim 1, wherein the programmable logic devices include field-programmable gate arrays (FPGAs), or complex programmable logic devices (CPLDs), or both.

8. A method comprising:
retrieving a first configuration code associated with a first field programmable gate array (FPGA), wherein the first configuration code is stored on a programmable read only memory (PROM) which contains a firmware including at least the first configuration code and a system boot code;
programming, by a configuration agent, the first FPGA using the first configuration code;
switching, by the configuration agent, to enable a pass-through interface between the PROM and a central processing unit (CPU) such that the CPU is able to access the system boot code, wherein the CPU and the PROM are indirectly coupled,
holding, by the configuration agent, a system reset to the CPU temporarily while programming at least the first FPGA; and
releasing, by the configuration agent, the system reset to the CPU to prepare a pre-boot environment for an operating system.

9. The method of claim 8, wherein the first FPGA is one of a plurality of programming logic devices.

10. A system comprising:
a processor;
one or more programmable logic devices including a first field programmable gate array (FPGA);

a programmable read only memory (PROM) to store a firmware image including at least a system boot code and a first configuration code; and a configuration agent to program the first FPGA by using the first configuration code and to release a reset to the processor after the first FPGA is configured, wherein the PROM is indirectly coupled to the processor, and wherein the configuration agent is operable to switch a connection to create a pass-through path for the processor to access the system boot code after the reset has been released, wherein during a system boot sequence, the configuration agent is operable to hold the processor at reset temporarily before the reset is released to the processor.

* * * * *